United States Patent Office.

RICHARD OTTO FR. HAILER, OF LUDWIGSHAFEN, GERMANY, ASSIGNOR TO BADISCHE ANILIN & SODA FABRIK, OF LUDWIGSHAFEN, GERMANY, A CORPORATION.

BROWN SULFUR DYE AND PROCESS OF MAKING SAME.

SPECIFICATION forming part of Letters Patent No. 690,271, dated December 31, 1901.

Application filed October 8, 1901. Serial No. 77,999. (No specimens.)

*To all whom it may concern:*

Be it known that I, RICHARD OTTO FRIEDRICH HAILER, doctor of philosophy and chemist, a subject of the King of Würtemberg, residing at Ludwigshafen-on-the-Rhine, in the Kingdom of Bavaria, Germany, have invented new and useful Improvements in New Brown Coloring-Matter and Process of Producing the Same, of which the following is a specification.

I have discovered that on treating symmetrical hexanitro-diphenylamin (see Beilstein, *Handbuch der Organischen Chemie*, third edition, Vol. 2, page 340) with sulfur and sodium sulfid a valuable new coloring-matter is formed which dyes cotton directly brown shades.

The following example will serve to further illustrate the nature of this invention and the manner in which the same may be carried into practical effect; but the invention is not confined to this example. The parts are by weight.

Example: Dissolve two hundred and fifty (250) parts of crystallized sodium sulfid in one hundred (100) parts of water and gradually introduce into this solution at a temperature of forty-five degrees (45°) to fifty degrees (50°) centigrade fifty (50) parts of hexanitro-diphenylamin. When the reaction which takes place is over, add one hundred (100) parts of sulfur, boil up the mass until thick, and bake at a temperature of one hundred and forty degrees (140°) centigrade. The coloring-matter thus obtained can be directly employed for dyeing. Its solution in water is brown. On the addition thereto of hydrochloric acid, ammonium chlorid, common salt, or the like the coloring-matter is precipitated in brown flocks. It dissolves in concentrated sulfuric acid, the solution being yellow-brown. The dyeings produced on cotton by its use are brown and exceedingly fast, and on treatment with chromealum and copper sulfate or with potassium chromate or with copper sulfate and acetic acid the dyeings become somewhat deeper; but on treatment with potassium chromate and sulfuric acid or with hydrogen peroxid the dyeings become somewhat lighter. The dyeings can be developed by means of diazo compounds on the fiber, or they can be diazotized on the fiber and coupled with suitable dyestuff components—for instance, beta-naphthol—whereby various valuable and fast shades can be produced.

Now what I claim is—

1. The manufacture of brown coloring-matter by melting hexanitro-diphenylamin with an alkaline sulfid and sulfur, substantially as described.

2. The new brown coloring-matter such as can be obtained by melting hexanitro-diphenylamin with sodium sulfid and sulfur, whose solution in water is brown, being precipitated therefrom in brown flocks by the addition of ammonium chlorid, which dissolves in concentrated sulfuric acid with a yellow-brown color, which dyes unmordanted cotton brown shades, which shades on treatment with chrome-alum become deeper, but which on treatment with potassium chromate and sulfuric acid become lighter, which can be diazotized on the fiber and coupled with beta-naphthol, substantially as described.

In testimony whereof I have hereunto set my hand in the presence of two subscribing witnesses.

RICH. OTTO FR. HAILER.

Witnesses:
JOHN L. HEINKE,
JACOB ADRIAN.